June 7, 1932. J. CAVANAGH 1,861,686
METHOD OF INCORPORATING SOCK LININGS IN SHOES
Original Filed Oct. 14, 1925
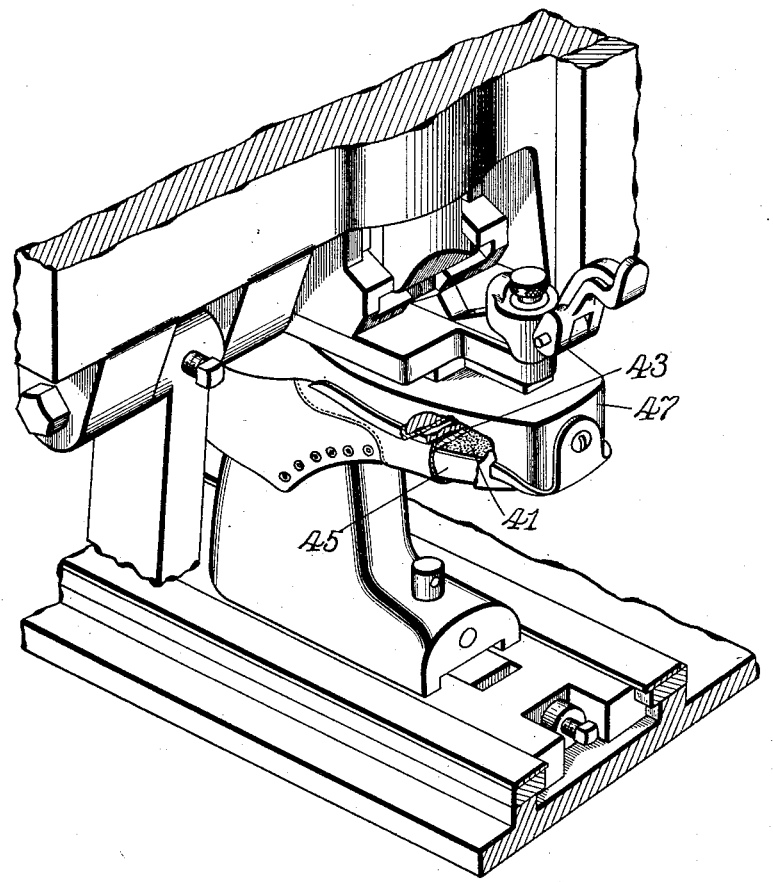
INVENTOR.
James Cavanagh
By his Attorney
Nelson W. Howard Patented June 7, 1932

1,861,686

UNITED STATES PATENT OFFICE

JAMES CAVANAGH, OF COHASSET, MASSACHUSETTS, ASSIGNOR TO UNITED SHOE MACHINERY CORPORATION, OF PATERSON, NEW JERSEY, A CORPORATION OF NEW JERSEY

METHOD OF INCORPORATING SOCK LININGS IN SHOES

Original application filed October 14, 1925, Serial No. 62,487. Divided and this application filed February 14, 1930. Serial No. 428,542.

This invention relates to methods of handling articles and of causing them to adhere to one another and is herein set forth by way of illustration with especial reference to incorporating a shoe part, such as a sock lining, in a shoe, the present application being a division of application Serial No. 62,487, filed October 14, 1925 in my name, upon which Letters Patent No. 1,779,368 was granted October 21, 1930.

In many of the operations which are carried out in the manufacture of boots and shoes, cement of one kind or another is used to attach certain parts to each other. These operations are usually carried out in one of three ways. (1) One or both surfaces of one of the articles which are to be caused to adhere to each other is given a coat of cement, and then the articles are pressed together while the cement is wet and held in contact until the cement has set. (2) Both articles are coated with cement on the two surfaces which are to be caused to adhere to each other, allowed to stand for an interval until the desired tackiness develops in the cement and then pressed together. (3) The articles are coated on two surfaces, as just recited, and allowed to stand until the coatings are dry, after which the coatings are softened by application of heat or a solvent to make them tacky, whereupon the articles are pressed together.

The methods which have been recited above necessitate certain disadvantageous procedures, examples of which are the following. In the method in which the articles are pressed together while the cement (for example, paste) is wet, the pressing must take place immediately subsequent to the application of the cement and must be continued until the cement has set. In the method in which the cement (for example rubber cement) is permitted to dry somewhat, until the desired tackiness appears, the pressing must take place during an interval which is fixed between rather narrow limits. In the method in which the cement (for example gutta-percha) is allowed to stand until it becomes dry, a resoftening operation must be performed. Viewing the matter broadly, there are at least two disadvantages, either the time at which the pressing must take place is fixed so that the operator cannot choose his own most convenient time to do the pressing, or else some sort of a resoftening operation must be performed on the dried coating of cement.

There are performed in the manufacture of boots and shoes a large number of cementing operations most of which fall within the methods numbered (1) and (2) in which either the pressing must take place immediately after the cement is applied and continued until the cement has set or cannot take place until after the cemented articles have stood for an interval but not long enough for the cement to become dry. In many cases it would be more convenient for the operator and more economical of his time if the articles could be coated one after another, allowed to stand for a more or less indefinite interval, which might be several days or even weeks, and then assembled and pressed together without resoftening the cement.

I have found, as set forth in my prior application referred to, that when the surfaces of articles such as shoe parts are coated with water-dispersed rubber such as rubber latex and the articles are allowed to stand until the coated surfaces are dry and for a more or less indefinite interval thereafter, such articles may still be caused to adhere firmly to one another by superposing them with their coated surfaces in contact and pressing them together with considerable force. I have found further that the coating of rubber latex will dry in a very short interval, the interval depending somewhat upon the material of which the article is made so that the coated articles, shortly after having been coated, may be thrown indiscriminately into a receptacle and allowed to remain in contact with one another without becoming stuck together, or at least without becoming stuck together to a degree sufficient to interfere with picking them up, and using them in the manufacture of shoes.

According to the present invention two shoe parts, which are to be caused to adhere to each other in the finished shoe, are each coated on one face with rubber latex cement and the coatings allowed to dry. One of the shoe parts is then incorporated in a shoe in such manner as to leave its coated surface exposed, after which the second shoe part is placed with its coated surface in contact with the coated surface of the other shoe part, and the two parts are pressed together. In the particular case chosen for illustration in which the two shoe parts are an insole and a sock lining, a quantity of insoles and a quantity of sock linings may be coated and the coatings permitted to dry. Within a more or less indeterminate interval, at a time when it is convenient to do so, the coated insoles may be incorporated in shoes; and subsequently, also at a convenient time, the coated sock linings may be located upon the insoles and pressed into place.

Referring now to the accompanying drawing:—

The figure is a perspective of a portion of a sole levelling machine showing the pressing of a sock lining into place during the levelling operation.

The shoe shown in the figure is a McKay shoe having an insole 43 against which a sock lining 41 is being pressed. In practising the method the insole and the sock lining may each be coated on one face with rubber latex cement and the coatings allowed to dry. The insole may then be incorporated in the shoe in the usual manner. When the shoe with the insole incorporated in it reaches the levelling machine operator, he places the sock lining, coated side up, upon the bottom of the jack 45, places the shoe upon the jack with the coated face of the insole in contact with the coated face of the sock lining and causes the presser 47 to descend so that, simultaneously with the levelling of the outsole, the sock lining is pressed firmly against the insole. In this procedure, not only is the advantage obtained of permitting the sock linings and the insoles to be coated at different times and places, if desired, and to stand for different and indeterminate intervals, but the laying of the sock lining as a separate operation is obviated.

In addition to the advantages which have been pointed out above, rubber latex possesses the further advantages that it produces a substantially waterproof joint that, because of its aqueous vehicle, it penetrates leather and similar materials more thoroughly than does rubber cement, and that it is effective on greasy leather, such for example as viscolized leather to which rubber cement will scarcely adhere.

Throughout the specification the term "rubber latex" has been used in order to promote brevity. Commercial rubber latex is essentially an aqueous dispersion of rubber of which the rubber content is commonly from 33 to 38 per cent by weight. Commercial rubber latex may be used undiluted in case a particularly strong bond is required but for most purposes the latex may be diluted to a considerable extent. It should be understood, therefore, that the particular rubber content of the latex used is immaterial so long as it is sufficient to produce a bond of the requisite strength. It should also be understood that there may be added to the rubber latex, whether diluted or not, ingredients which tend to prevent coagulation or fermentation, or to vary the viscosity or affect the adhesive quality, provided that such ingredients do not adversely affect the capability of coatings of the mixture or compound to respond to pressure in the manner which has been described. The term "rubber latex cement", then, as used in the appended claims is intended to cover any cement the basis of which is water dispersed rubber.

Having thus described my invention, what I claim as new and desire to secure by Letters Patent of the United States is:—

1. The method of incorporating sock linings in shoes which comprises coating the inner face of an insole with rubber latex cement, allowing the coating to dry until it is non-tacky, employing the insole in the manufacture of a shoe in any suitable manner, coating the under face of a sock lining with rubber latex cement, allowing the coating to dry until it is non-tacky, inserting the sock lining in the shoe with its coated face in contact with the coated face of the insole, and pressing it into place.

2. The method of incorporating sock linings in shoes which comprises coating the inner face of an insole with rubber latex cement, allowing the coating to dry until it is non-tacky, employing the insole in the manufacture of a shoe in any suitable manner, coating the under face of a sock lining with rubber latex cement, allowing the coating to dry until it is non-tacky, inserting the sock lining in the shoe with its coated face in contact with the coated face of the insole, prior to the leveling operation, and leveling the shoe whereby the pressure applied during said operation fixes the sock lining firmly in place.

In testimony whereof I have signed my name to this specification.

JAMES CAVANAGH.